United States Patent
Kim et al.

(10) Patent No.: US 7,526,050 B2
(45) Date of Patent: Apr. 28, 2009

(54) CCK DEMODULATION VIA SYMBOL DECISION FEEDBACK EQUALIZER

(75) Inventors: Younggyun Kim, Irvine, CA (US); Jaekyun Moon, Plymouth, MN (US)

(73) Assignee: DSP Group Inc., Santa Clara, CA (US)

( * ) Notice: Subject to any disclaimer, the term of this patent is extended or adjusted under 35 U.S.C. 154(b) by 1428 days.

(21) Appl. No.: 10/460,766

(22) Filed: Jun. 12, 2003

(65) Prior Publication Data
US 2004/0057532 A1 Mar. 25, 2004

Related U.S. Application Data

(60) Provisional application No. 60/388,997, filed on Jun. 12, 2002.

(51) Int. Cl.
*H03D 1/00* (2006.01)
(52) U.S. Cl. .................. 375/343; 375/286; 375/340; 375/341
(58) Field of Classification Search .......... 375/286, 375/340–43
See application file for complete search history.

(56) References Cited

U.S. PATENT DOCUMENTS

| | | | |
|---|---|---|---|
| 4,270,179 A | 5/1981 | Sifford et al. | |
| 5,533,063 A | 7/1996 | Mitra et al. | |
| 5,777,692 A | 7/1998 | Ghosh | |
| 6,233,273 B1 * | 5/2001 | Webster et al. | 375/148 |
| 6,614,836 B1 * | 9/2003 | Halford et al. | 375/152 |
| 7,027,538 B2 * | 4/2006 | Ghosh | 375/350 |
| 7,187,730 B1 * | 3/2007 | Hu et al. | 375/343 |

OTHER PUBLICATIONS

Pearson, Bob, "Complementary Code Keying Made Simple," Application Note, Intersil, Nov. 2001.

* cited by examiner

*Primary Examiner*—David C Payne
*Assistant Examiner*—Leon Flores
(74) *Attorney, Agent, or Firm*—Shumaker & Sieffert, P.A.

(57) ABSTRACT

Demodulation techniques for a wireless communication system make use of a decision feedback equalization (DFE) technique to mitigate the effects of multipath channel characteristics on receiver performance. The techniques may be particularly useful in the demodulation of complementary code keying (CCK) symbols. A demodulator that performs such techniques may include a time-variant or time-invariant matched filter, a feedback intersymbol interference (ISI) canceller, a transform unit, a phase rotation estimator and corrector, a pattern-dependent bias canceller, and a maximum picker for symbol decisions. The transform unit may include a bank of correlators, or alternatively a fast Walsh transform unit.

31 Claims, 6 Drawing Sheets

CCK DEMODULATION VIA SYMBOL DECISION FEEDBACK EQUALIZER

This application claims priority from U.S. provisional application Ser. No. 60/388,997, filed Jun. 12, 2002, the entire content of which is incorporated herein by reference.

FIELD

The invention relates to wireless communication and, more particularly, to techniques for demodulation of wireless signals.

BACKGROUND

Wireless communication involves transmission of encoded information on a modulated radio frequency (RF) carrier signal. A wireless receiver includes an RF antenna that receives a wireless signal, and a demodulator that converts the RF signal to baseband. In order to correctly decode the received signal, some system components are required to reduce the time domain effects of noise and more specifically multi-path delay spread (MDS), classically known as intersymbol interference (ISI). In general, a receiver includes a filter, or system of filters, intended to eliminate as much noise and ISI as possible.

SUMMARY

The invention is directed to demodulation techniques for a wireless communication system. In particular, the demodulation techniques make use of a decision feedback equalization (DFE) technique to mitigate the effects of multipath channel characteristics on receiver performance. The invention may be particularly useful in the demodulation of complementary code keying (CCK) symbols.

A demodulator that performs such techniques, in accordance with the invention, may include a time-variant or time-invariant matched filter, a feedback intersymbol interference (ISI) canceller, a transform unit, a phase rotation estimator and corrector, a pattern-dependent bias canceller, and a maximum picker for symbol decisions. The transform unit may include a bank of correlators, or alternatively a fast Walsh transform unit. The invention may be optimized when using a CCK technique, but is not limited to this coding scheme.

The demodulation techniques disclosed herein permit implementation of transmit symbol detection using block-wise decision feedback filtering and likelihood computation. The techniques may support parallel computation and subtraction of pattern-dependent biases from correlator outputs. With appropriate coefficient changes, the filter may be placed before or after a subtract circuit associated with the feedback filter output. The coefficients of the filter and the pattern-dependent biases that need to be subtracted from the correlator outputs can be calculated from the channel response.

For block decoding of transmit symbols, the correlator size can be increased to cover all possible combinations of the transmit symbol sequence. In one application, for example, the demodulation techniques may be applied to a CCK signal. In this case, the correlator may be configured to correlate the input signal with all distinct CCK codes. The common phase to a code is processed separately by estimating the phase from each correlator output and compensating this phase in the correlator output before picking the maximum. In addition, computation of each pattern-dependent bias in the demodulator can be computed by correlating the channel response with a particular code pattern, and magnitude-squaring and accumulating the results.

A receiver structure that includes a matched filter inside a feedback loop. In this design, feedback ISI cancellation occurs before matched filtering. Alternatively, a receiver structure has a matched filter outside a feedback loop. In this alternate design, feedback ISI cancellation occurs after a matched filter process. Different feedback filter coefficients are applied for each case.

In one embodiment, the invention provides a method comprising generating a feedback signal based on a first symbol decision for a first wireless signal observation, applying the feedback signal to a received wireless signal to produced a second wireless signal observation, correlating the second wireless observation with a plurality of candidate modulation patterns. estimating and correcting a phase rotation for each of the modulation patterns, selecting one of the modulation patterns based on a maximum likelihood function, and generating a second symbol decision based on the estimated phase rotation and the selected modulation pattern.

In another embodiment, the invention provides a wireless communication device comprising a feedback loop that generates a feedback signal based on a first symbol decision for a first wireless signal observation, and applies the feedback signal to a received wireless signal to produced a second wireless signal observation, a correlator that correlates the second wireless observation with a plurality of candidate modulation patterns, a phase estimator that estimates a phase rotation of each of the modulation patterns, a phase corrector that corrects the phase rotation for each of the modulation patterns based on the estimated phase rotation, a maximum picker that selects one of the modulation patterns based on a maximum likelihood function, and a symbol estimator that generates a second symbol decision based on the estimated phase rotation and the selected modulation pattern.

In a further embodiment, the invention provides a wireless communication device comprising means for generating a feedback signal based on a first symbol decision for a first wireless signal observation, means for applying the feedback signal to a received wireless signal to produced a second wireless signal observation, means for correlating the second wireless observation with a plurality of candidate modulation patterns, means for estimating and correcting a phase rotation for each of the modulation patterns, means for selecting one of the modulation patterns based on a maximum likelihood function, and means for generating a second symbol decision based on the estimated phase rotation and the selected modulation pattern.

In an added embodiment, the invention provides a wireless communication device comprising a receiver to receive a wireless signal, a symbol estimator to generate a symbol decision for the received wireless signal, and a symbol decision feedback equalization system to reduce multipath channel effects on the symbol decision based on past symbol decisions.

The invention may provide one or more advantages. For example, the invention may decrease computational complexity by estimating a common phase rotation separately from demodulating the code pattern associated with received signals. In the IEEE 802.11b standard, only 64 patterns are allowed, each with four possible phase rotations, instead of 256 chip sequences. The invention may offer significant performance advantages over existing receivers, such as RAKE receivers, from both a speed, cost and packet error rate standpoint, especially for severe multipath channels. In general, the demodulation techniques described in this disclosure exhibit increased tolerance to multipath, and offer enhanced performance, even in the case of delay spread, provided the channel signal-to-noise ratio is sufficiently high.

Additional details of various embodiments are set forth in the accompanying drawings and the description below. Other features, objects and advantages will become apparent from the description and drawings, and from the claims.

DETAILED DESCRIPTION

Figure 1:
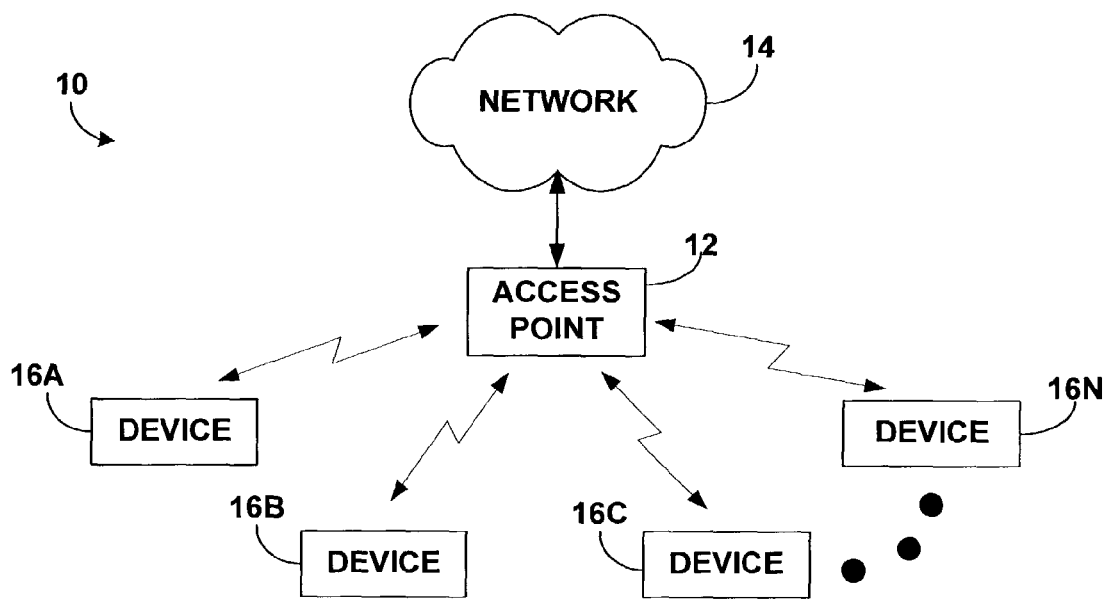
FIG. 1 is a block diagram illustrating a wireless communication network.

FIG. 1 is a block diagram illustrating a wireless communication network 10. As shown in FIG. 1, wireless communication network 10 may include a wireless access point 12 coupled to a wired network 14. Wireless access point 12 permits wireless communication between wired network 14 and one or more wireless communication devices 16A-16N (hereinafter 16). Wireless access point 12 and wireless communication devices 16 form WLAN "stations," and may communicate according to one or more WLAN protocols such as those specified by the IEEE 802.11a, 802.11b or 802.11g standards. Wireless communication network 10 will be generally described herein in the context of the IEEE 802.11 standards for purposes of illustration.

Wireless access point 12 may integrate a hub, switch, or router to serve multiple wireless communication devices 16. Wireless communication network 10 may be used to communicate data, voice, video, and the like between devices 16 and wired network 14 according to a variety of different wireless transmission formats. Network 14 may be a local area network, wide area network, or global network such as the Internet.

Devices 16 may take a variety of forms including desktop computers, portable computers, personal digital assistants (PDAs), mobile telephones, multimedia devices, consumer electronics, and the like. Each device 16 is equipped with WLAN station hardware to provide attachment to wireless communication network 10. For example, a device 16 may include a WLAN station card or board coupled to a host computer via an external or internal interface, including PCI, Mini PCI, USB, USB-2, Cardbus, IEEE 1394, SCSI, or PCM-CIA interfaces.

Figure 2:
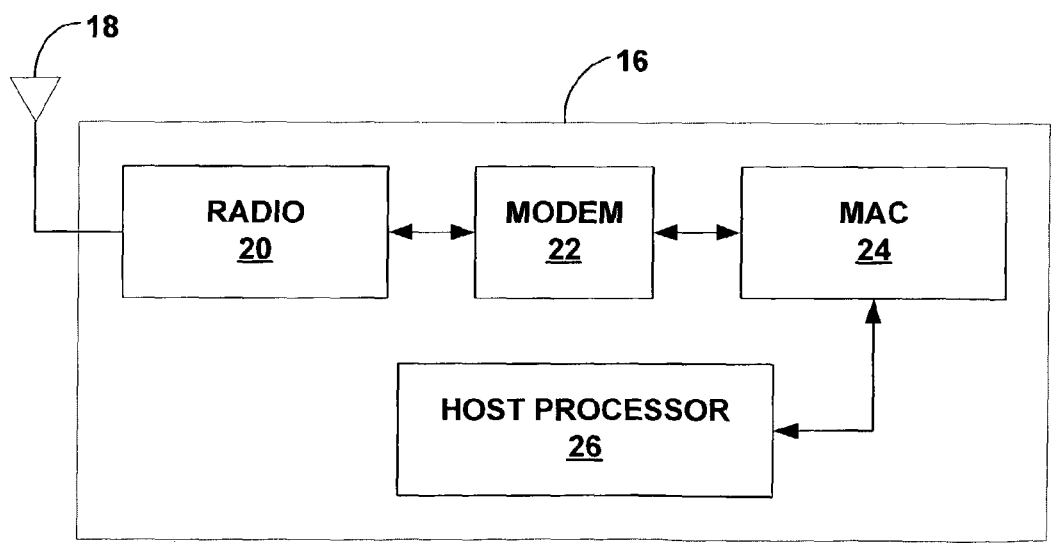
FIG. 2 is a block diagram illustrating a wireless communication device useful in the network of FIG. 1.

FIG. 2 is a block diagram illustrating a wireless communication device 16 in further detail. As shown in FIG. 2, wireless communication device 16 includes a radio frequency (RF) antenna 18, a radio 20, a modem 22, a media access controller (MAC) 24, and a host processor 26. RF antenna 18 transmits and receives RF signals. In some cases, however, transmit and receive circuitry may be formed by separate transmitter and receiver components. For purposes of illustration, discussion herein will be generally limited to the receiver and demodulation aspects of radio 20 and modem 22. Modem 22 handles baseband processing of packets transmitted and received via radio 20 and antenna 18. Radio 20 may include circuitry for upconverting signals to RF for transmission, and downconverting received RF signals to baseband for processing by modem 22. Modem 22 encodes and decodes information carried by packets transmitted and received via radio 20 and antenna 18.

MAC 24 interacts with host 26 to facilitate communication between modem 22 and applications running on the host. Hence, host 26 may be a CPU within a computer, PDA, mobile telephone or some other device. MAC 24, modem 22, and radio 20 may be on a common integrated circuit chip, distributed across multiple chips or realized by discrete components.

Figure 3:
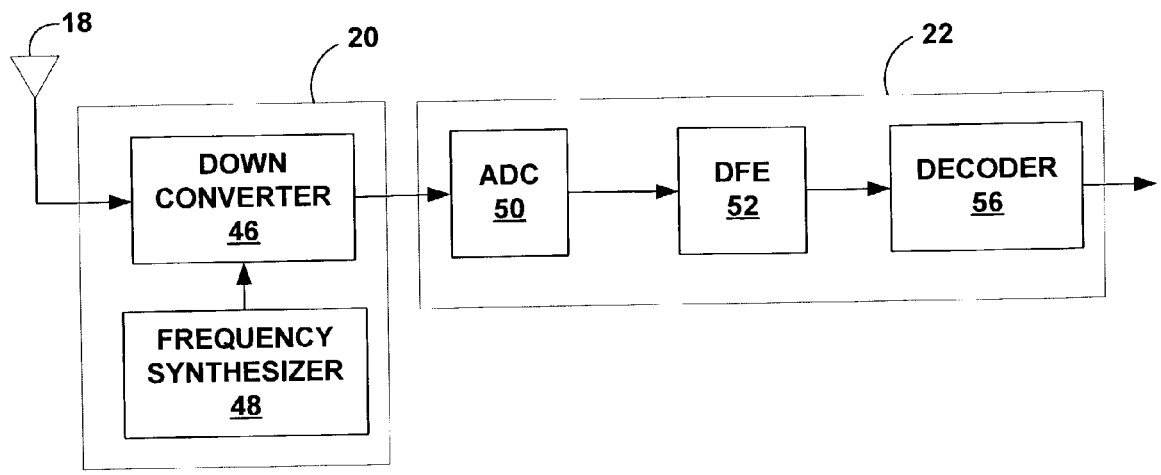
FIG. 3 is a block diagram illustrating a radio and modem of a wireless communication device in greater detail.

FIG. 3 is a block diagram illustrating antenna 18, radio 20, and modem 22 of a wireless communication device in further detail. Radio 20 includes a downconverter 46 and a frequency synthesizer 48 to convert a signal received by antenna 18 to the baseband. Modem 22 can then decode the baseband signal and recover the original transmitted information. Modem 22 may include an analog-to-digital converter (ADC) 50, a decision feedback equalizer (DFE) 52, and a decoder 56. ADC 50 converts the analog baseband signal received by antenna 18 and radio 20 to a digital signal. DFE 52 uses past pattern decisions to eliminate noise and ISI in the digital signal. Decoder 56 uses the signal from DFE 52 to decode the signal received by antenna 18 and radio 20 and retrieve the original transmitted information.

Figure 4:
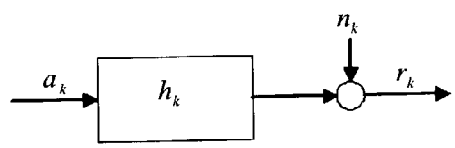
FIG. 4 is a block diagram illustrating the multipath channel model.

FIG. 4 illustrates the multipath channel model. As shown in FIG. 4, a transmitted CCK chip sequence is represented as $a_k$. In FIG. 4, channel gain is represented by $h_k$, channel noise is represented by $n_k$, and the channel output signal is represented by $r_k$. The multi-path interference is manifested as ISI and is modeled effectively as a finite impulse response (FIR) filter acting on the sequence $a_k$. In CCK modulation, a CCK symbol is made up of eight consecutive chips, and decisions on the chip sequence $a_k$ are made on a symbol-by-symbol basis. That is, releasing a symbol decision is equivalent to making simultaneous decisions on eight consecutive chips. This specific format meets the IEEE 802.11b standard, although the proposed technique may be applicable to any chip to symbol ratio.

Figure 5:
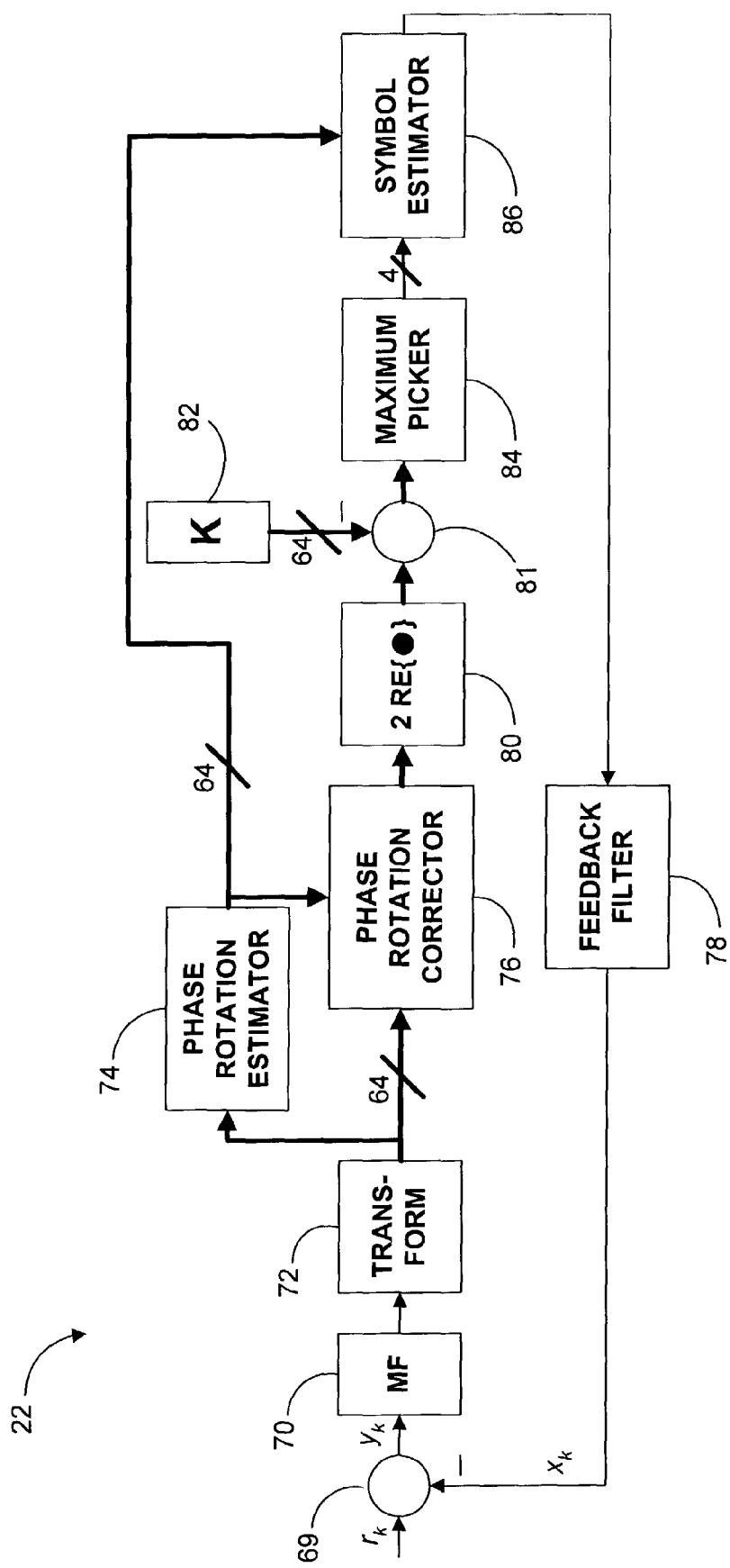
FIG. 5 is a block diagram illustrating one possible configuration of a DFE receiver for a wireless communication device.

FIG. 5 is a block diagram illustrating modem 22, and particularly DFE 52, in further detail. Modem 22 is configured to implement a demodulation technique for a wireless communication system in accordance with the invention. As shown in FIG. 5, modem 22 includes a feedback subtraction unit 69, a matched filter (MF) 70, a transform unit 72, a phase rotation estimator 74, a phase rotation corrector 76, a feedback filter 78, a real component generator 80, a subtraction unit 81, a coefficient input 82, a maximum picker 84, and a symbol estimator 86. In FIG. 5, the received signal is represented by $r_k$, the feedback signal is represented by $x_k$, and the observation signal is represented by $y_k$.

For purposes of illustration, discussion will generally be limited to demodulation of a CCK modulated signal. The original CCK chip sequence is denoted by $\{a_k, a_{k+1}, \ldots, a_{k+7}\}$. As will be described, the post-cursor ISI is canceled in feedback filter 78 using past decisions. The past decisions applied are $\{\hat{a}_{k-1}, \hat{a}_{k-2}, \hat{a}_{k-3}, \ldots\}$ and may be generated by a preamble pattern included with the signal. The feedback signals output by feedback filter 78 can be formed as $$x_{k+l} = \sum_{i=1}^{\infty} a_{k-i} h_{i+l}, \tag{1}$$

for $0 \leq l \leq 7$, where the past decision $\hat{a}_k$ is assumed to be the same as the actual input $a_k$. The feedback signal may then be subtracted from the received signal $r_{k+l}$, to form an observation signal $y_{k+l}$ for $0 \leq l \leq 7$:

$$y_{k+l} = r_{k+l} - x_{k+l}. \tag{2}$$

For the purposes of this invention $x_{j-1}$ is not a delayed version of $x_j$.

In the IEEE 802.11b standard, all eight chips that belong to a given CCK symbol are subject to a common phase rotation. This feature allows an expression $a_{k+l} = e^{j\phi_1} b_{k+l}$ for $0 \leq l \leq 7$, where $\phi_1$ denotes a common phase term. A noiseless version of $y_{k+l}$, assuming correct past decisions, can be written as $$u_{k+l} = \sum_{i=0}^{7} a_{k+i} h_{l-i} \tag{3}$$

$$= \sum_{i=0}^{7} b_{k+i} h_{l-i} e^{j\phi_1},$$

$$= s_{k+l} e^{j\phi_1}$$

for $0 \leq l \leq 7$, where $s_k$ is defined as $$s_{k+l} = \sum_{i=0}^{7} b_{k+i} h_{l-i} \tag{4}$$

for $0 \leq l \leq 7$.

The overall goal of modem 22 is to find the most likely chip sequence $\{a_k, a_{k+1}, \ldots, a_{k+7}\}$ given the observation sequence $\{y_k, y_{k+1}, \ldots, y_{k+7}\}$. Given that the phase rotation is fixed over a symbol period, this goal may be simplified to finding the most likely pattern $\{b_k, b_{k+1}, \ldots, b_{k+7}\}$ and angle $\phi_1$ given the observation $\{y_k, y_{k+1}, \ldots, y_{k+7}\}$. For additive white Gaussian noise, the corresponding maximum likelihood (ML) detector performs the following minimization:

$$C = \underset{\{b_{k+i}\}_{i=0}^{7}, \phi_1}{\operatorname{argmin}} \sum_{l=0}^{7} |y_{k+l} - s_{k+l} e^{j\phi_1}|^2. \tag{5}$$

where $\{b_{k+l}\}_{l=0}^{7}$ is a short-hand notation for $\{b_k, b_{k+1}, \ldots, b_{k+7}\}$. The summation in (5) may be viewed as an error cost function that represents the goal of modem 22.

The procedure is repeated for the next CCK symbol after k is replaced by k+8 in (5). Performance may be improved further by phase equalization of the channel response if the channel is not already minimum phase. The same approach may be used with or without phase equalization by assuming $h_k$ is representative of a combined channel and equalizer response. A less complex method to deal with channel responses with a small energy concentration in early samples is to simply ignore the early portion of the channel response with small magnitudes. In accordance with the invention, a preset number of initial channel response samples having magnitudes that fall below a certain threshold may be ignored.

To find an implementation structure for estimating $\{b_{k+i}\}_{i=0}^{7}$, the cost function C of (5) needs be manipulated further. Expanding the parenthesis of (5), the cost function is represented by $$C = \sum_{l=0}^{7} \{|y_{k+l}|^2 + |s_{k+l}|^2 - 2\operatorname{Re}\{y_{k+l} s_{k+l}^* e^{-j\phi_1}\}\}. \tag{6}$$

Removing the constant term $$\sum_{l=0}^{7} |y_{k+l}|^2$$

in (6), the cost function can be redefined as $$C' = \sum_{l=0}^{7} \{|s_{k+l}|^2 - 2\operatorname{Re}\{y_{k+l} s_{k+l}^* e^{-j\phi_1}\}\}. \tag{7}$$

The cost function can be further represented by:

$$\sum_{l=0}^{7} y_{k+l} s_{k+l}^* = \sum_{l=0}^{7} y_{k+l} \sum_{i=0}^{7} b_{k+i}^* h_{l-i}^* = \sum_{i=0}^{7} b_{k+i}^* \sum_{l=0}^{7} y_{k+l} h_{l-i}^*. \tag{8}$$

The inner summation in the right hand side of the last equality in (8) represents the case when matched filter 70 is a time-varying matched filter (TVMF) operation on $y_k$, wherein the filter coefficients change in a systematic way as i progresses from 0 to 7. More specifically, at i=0, the filter coefficients start with $\{h_7^*, h_6^*, h_5^*, \ldots, h_0^*\}$. As i progresses, i leftmost coefficients are simply replaced by zero. The outer summation represents a correlation with a given $b_k$ pattern and can be implemented using transform unit 72, or for the CCK case a Fast Walsh Transformer (FWT) may be used.

It is noted from (1) that the feedback filter may also be implemented as a time-varying filter whose coefficients start with $\{h_L, h_{L-1}, \ldots, h_2, h_1\}$, where L denotes the length of the channel response, at i=0 of which i rightmost taps are replaced increasingly by zero as i progresses to 7.

The first term in the right hand side of (7) may be expanded as $$\sum_{l=0}^{7} |s_{k+l}|^2 = \tag{9}$$

$$\sum_{l=0}^{7} \sum_{i=0}^{7} b_{k+i} h_{l-i} \sum_{j=0}^{7} b_{k+j}^* h_{l-j}^* = \sum_{i=0}^{7} \sum_{j=0}^{7} b_{k+i} b_{k+j}^* \sum_{l=0}^{7} h_{l-i} h_{l-j}^*$$

which can be precomputed and saved for all 64 candidate $\{b_{k+i}\}_{i=0}^{7}$ patterns, once the estimated channel response is available for a given packet. The computation of (9) can also be carried out by feeding the channel response to transform unit 72, in the form of a correlator or fast Walsh transformer, and accumulating the absolute squared results. If the channel has no memory ($h_0 \neq 0$ and $h_i = 0$ for other i's), equation (9) becomes a pattern-dependent constant for all 64 patterns. In this case, the constant of equation (9) may be removed from the cost function of equation (7) without affecting detection performance.

As previously stated, in the IEEE 802.11b standard there are only 64 possible $\{b_{k+l}\}_{l=0}^{7}$ patterns versus 256 $\{a_{k+l}\}_{l=0}^{7}$ patterns. Thus, breaking the demodulation process of $\{a_{k+i}\}_{l=0}^{7}$ into demodulation of $\{b_{k+l}\}_{l=0}^{7}$ and estimation of the common phase reduces the complexity of a receiver significantly. The common phase rotation $\phi_1$ minimizing the cost function C from (5) can be found by taking the derivative of C as follows.

$$\frac{\partial C}{\partial \varphi_1} = \sum_{l=0}^{7} (-j y_{k+l}^* s_{k+l} e^{j\varphi_1} + j y_{k+l} s_{k+l}^* e^{-j\varphi_1}) \quad (10)$$

$$= 2j \sum_{l=0}^{7} (\text{Im}\{y_{k+l} s_{k+l}^*\} \cos\varphi_1 - \text{Re}\{y_{k+l} s_{k+l}^*\} \sin\varphi_1$$

Setting equation (10) to zero and solving for $\phi_1$, we arrive at an estimate:

$$\hat{\varphi}_1 = \tan^{-1} \frac{\text{Im}\left\{\sum_{l=0}^{7} y_{k+l} s_{k+l}^*\right\}}{\text{Re}\left\{\sum_{l=0}^{7} y_{k+l} s_{k+l}^*\right\}}. \quad (11)$$

Phase rotation estimator 74 may use the output (8) of transform unit 72 based on the estimation method of equation (11) to estimate a phase rotation for each candidate pattern $\{b_{k+i}\}_{i=0}^{7}$. The pattern-dependent constants (9), represented by vector K 82 of size 64, are subtracted from element 80, which doubles the real, phase corrected component of (8), at the input of maximum picker 84 to achieve the negative of cost function (7). The particular $\{b_{k+i}\}_{i=0}^{7}$ pattern corresponding to the maximum of the negative cost function (7), found by maximum picker 84, still has four phase possibilities. Combining the associated phase estimate, from element 74, of the chosen $\{b_{k+i}\}_{i=0}^{7}$ pattern, from maximum picker 84, constitutes a final CCK symbol decision.

Figure 6:
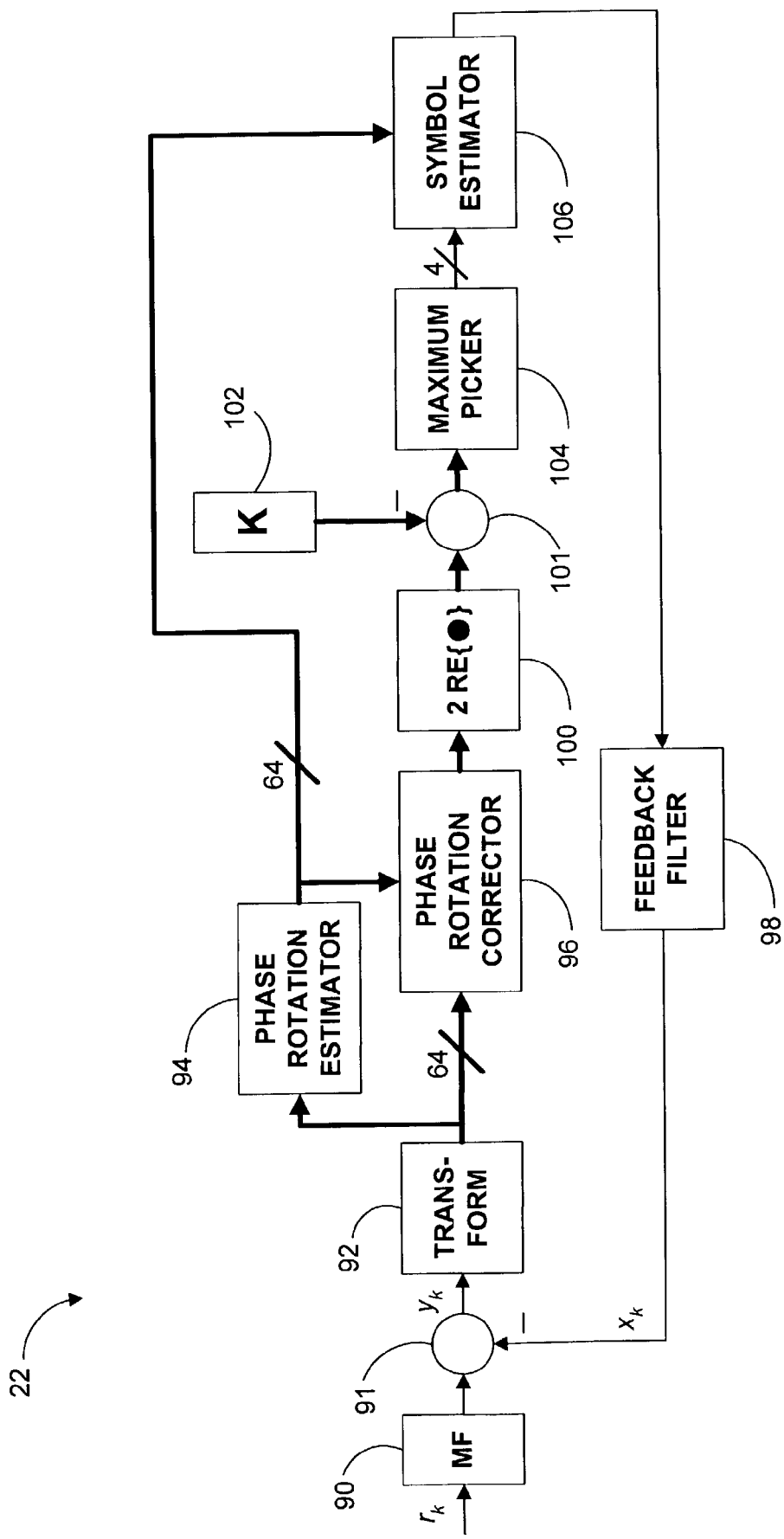
FIG. 6 is a block diagram illustrating an alternate configuration of a DFE receiver for a wireless communication device.

FIG. 6 is a block diagram illustrating an alternative configuration of modem 22. As in FIG. 5, modem 22 is configured to implement a demodulation technique for a wireless communication system in accordance with the invention. As shown in FIG. 6, modem 22 includes a matched filter (MF) 90, a feedback subtraction unit 91, a transform unit 92, a phase rotation estimator 94, a phase rotation corrector 96, a feedback filter 98, a real component generator 100, a subtraction unit 101, a coefficient input 102, a maximum picker 104, and a symbol estimator 106. In FIG. 6, the received signal is represented by $r_k$, the feedback signal is represented by $x_k$, and the observation signal is represented by $y_k$. This alternative implementation structure arises by rewriting equation (8) as $$\sum_{l=0}^{7} y_{k+l} s_{k+l}^* = \sum_{i=0}^{7} b_{k+i}^* \sum_{l=0}^{7} y_{k+l} h_{l-i}^* \quad (12)$$

$$= \sum_{i=0}^{7} b_{k+i}^* \sum_{l=0}^{7} [r_{k+l} - x_{k+l}] h_{l-i}^*$$

$$= \sum_{i=0}^{7} b_{k+i}^* \sum_{l=0}^{7} \left[r_{k+l} - \sum_{j=1}^{\infty} a_{k-j} h_{j+l}\right] h_{l-i}^*$$

$$= \sum_{i=0}^{7} b_{k+i}^* \left\{\sum_{l=0}^{7} r_{k+l} h_{l-i}^* - \sum_{j=1}^{\infty} a_{k-j} \sum_{l=0}^{7} h_{j+l} h_{l-i}^*\right\}$$

It can be seen from equation (12) that the coefficients of feedback filter 98 are different from that of FIG. 5. and that the matched filter (MF) operation 90 on received signal $r_k$ take place before feedback cancellation 91. Other than the matched filter operation occurring outside the feedback loop and the subsequent change in feedback coefficients, the two structure of FIGS. 5 and 6 are substantially the same. The functions of the corresponding elements of FIG. 6 are described above in reference to FIG. 5. Note that the structure of FIG. 6 can also be obtained directly from FIG. 5 by simply taking the matched filter (MF) 90 out of the forward path within the feedback loop and replicating it in the forward path outside the loop as well as in the feedback loop.

The two structure should yield identical results mathematically, but they have different impacts on implementation. The structure of FIG. 5 does not require extra computation in obtaining feedback coefficients from the estimated channel response, but is subject to a large latency, potentially making implementation more challenging.

Alternatively, the problem statement of equation (5) may be approximated by replacing the finite sum as follows:

$$\operatorname*{argmin}_{\{b_{k+i}\}_{i=0}^{7}, \varphi_1} \sum_{l=-\infty}^{\infty} |y_{k+l} - s_{k+l} e^{j\varphi_1}|^2. \quad (13)$$

Following the same steps as the previously described process, the phase rotation can be estimated in phase rotation estimator 74 or 94 by $$\varphi_1 = \tan^{-1} \frac{\text{Im}\left\{\sum_{l=-\infty}^{\infty} y_{k+l} s_{k+l}^*\right\}}{\text{Re}\left\{\sum_{l=-\infty}^{\infty} y_{k+l} s_{k+l}^*\right\}}. \quad (14)$$

The error cost function (7) is redefined as $$C'' = \sum_{l=-\infty}^{\infty} \{|s_{k+l}|^2 - 2\text{Re}\{y_{k+l} s_{k+l}^* e^{-j\varphi_1}\}\}. \quad (15)$$

The argument of the real part of (15) is given by $$\sum_{l=-\infty}^{\infty} y_{k+l} s_{k+l}^* = \sum_{i=0}^{7} b_{k+i}^* \left\{ \sum_{l=-\infty}^{\infty} r_{k+l} h_{l-i}^* - \sum_{j=1}^{\infty} a_{k-j} \sum_{l=-\infty}^{\infty} h_{j+l} h_{l-i}^* \right\} \quad (16)$$

$$= \sum_{i=0}^{7} b_{k+i}^* \left\{ \sum_{l=-\infty}^{\infty} r_{k+i+l} h_l^* - \sum_{j=1}^{\infty} a_{k-j} \sum_{l=-\infty}^{\infty} h_l h_{l-(i+j)}^* \right\}$$

Compared to equation (12), the matched filter operation 90 of (16) is time invariant and the control of the timing varying coefficients of the decision feedback filter 98 is easier. The bias term K 102 of (9) may also be modified to $$\sum_{l=-\infty}^{\infty} |s_{k+l}|^2 = \sum_{i=0}^{7} \sum_{j=0}^{7} b_{k+i} b_{k+j}^* \sum_{l=-\infty}^{\infty} h_{l-i} h_{l-j}^* \quad (17)$$

$$= \sum_{l=-\infty}^{\infty} |h_l|^2 \sum_{i=0}^{7} |b_{k+i}|^2 +$$

$$2\text{Re}\left\{ \sum_{d=1}^{7} \sum_{l=-\infty}^{\infty} h_l h_{l-d}^* \sum_{i=0}^{7-d} b_{k+i} b_{k+i+d}^* \right\}$$

The correlation sum of the channel response is common for both (16) and (17). Using the property of the complementary code, some of the correlation sums of the chip sequence will be reduced to zero. The correlation sum of the chip sequence can be denoted by $$B(d) = \sum_{i=0}^{7-d} b_i b_{i+d}^*.$$

In this case, the correlation sums B(d) for varying d are $B(0)=8$ $B(1)=-e^{j(\phi 4-\phi 2-\phi 3)}$ $B(2)=0$ $B(3)=2e^{j(\phi 4-\phi 2)}+e^{j(\phi 2+\phi 4-\phi 3)}$ $B(4)=0$ $B(5)=2e^{j(\phi 2+\phi 4)}-e^{j(\phi 3+\phi 4-\phi 2)}$ $B(6)=0$ $B(7)=e^{j(\phi 2+\phi 3+\phi 4)}$ Using (18), the computation complexity in computing (17) for each chip sequence can be reduced somewhat.

The implementation structure for the receiver defined in (13) will be the same as in FIG. 6 except that the coefficients of matched filter 90, decision feedback filter 98, and bias term K 102 will be different. The structure shown in FIG. 5 can be used to implement (13) as well.

The optimal symbol demodulation technique described first (type 1) as in equation (5) may perform better than that with an infinite sum approximation (type 2) as in equation (13). The type 2 receiver, however, may have some implementation advantage over type 1. Another alternative to the demodulation techniques represented by FIG. 5 and FIG. 6 may involve combining both types of receivers to reduce the computational complexity of the type 1 receiver at the cost of performance degradation. Specifically, the resulting hybrid structure may arise from the approximation:

$$\sum_{l=0}^{7} y_{k+l} s_{k+l}^* \approx \sum_{l=0}^{7} b_{k+i}^* \left\{ \sum_{l=0}^{7} r_{k+l} h_{l-i}^* - \sum_{j=1}^{\infty} a_{k-j} \sum_{l=-\infty}^{\infty} h_{j+l} h_{l-i}^* \right\}. \quad (19)$$

Effectively, same time-varying matched filter 70 (TVMF) of type 1 can be used with the adoption of a feedback filter 98 of type 2. The bias vector K is computed as in equation (9).

Figure 7:
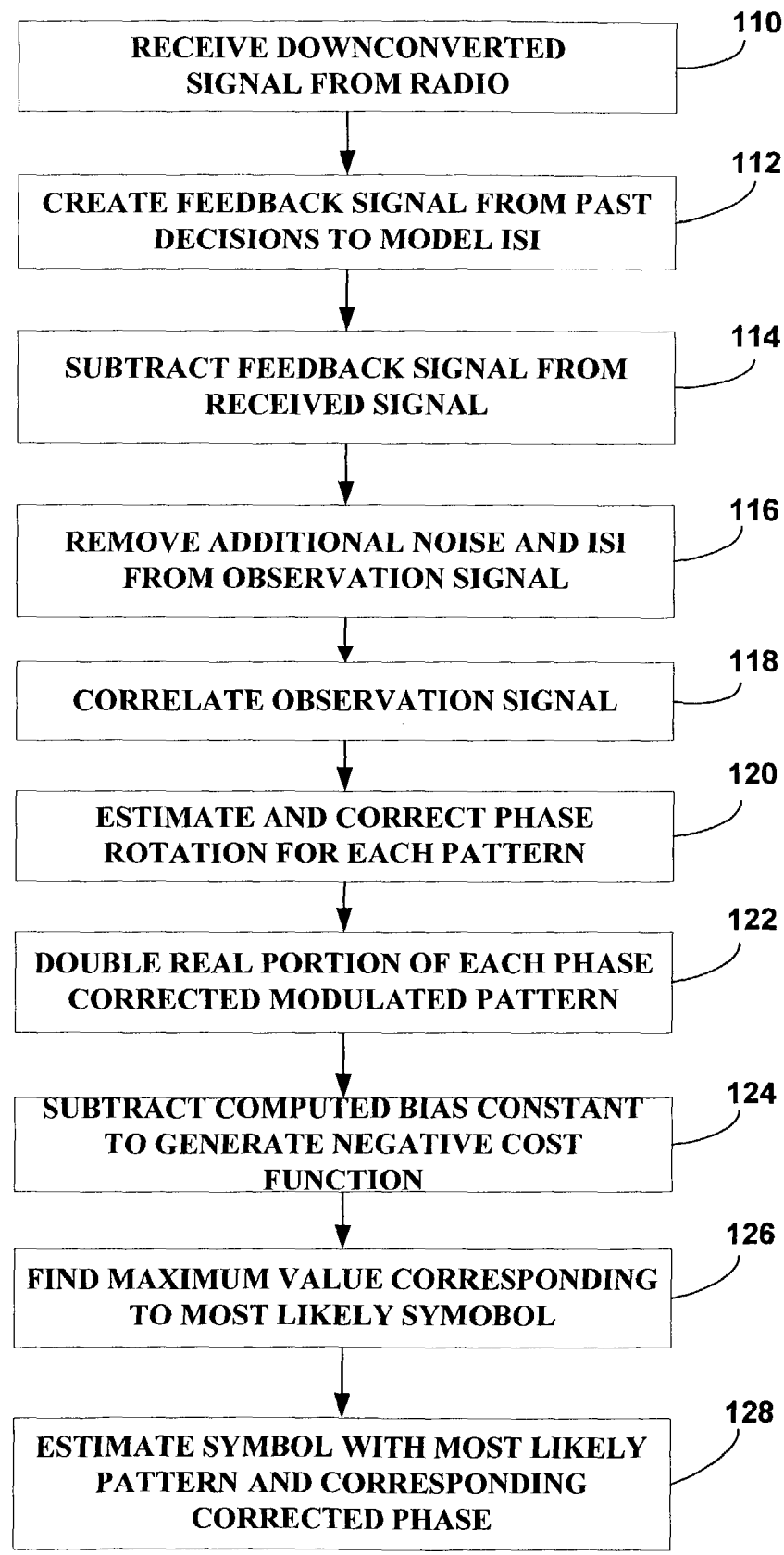
FIG. 7 is a flow diagram illustrating a process for choosing the most likely symbol pattern to correctly decode a received signal for the receiver configuration in FIG. 5.

FIG. 7 is a flow diagram illustrating a process for demodulating a received signal in a wireless communication system using a DFE technique. The modem processing the signal has the structure generally represented in FIG. 5. As shown in FIG. 7, modem 22 receives a downconverted signal from radio 20 (110). Feedback filter 78 creates a feedback signal from past decisions to model ISI effects (112); this signal is then subtracted from the received, downconverted signal to eliminate ISI (114). Matched filter 70 further removes noise and ISI from the observation signal (116). The matched filter operation may be a time variant or time invariant operation depending on the error cost function model used.

Transform operation 72 correlates the observation signal (118) generally using either a bank of correlators or, in the CCK case, a Fast Walsh Transform (FWT), to generate a complex value for each of the 64 $\{b_{k+i}\}_{i=0}^{7}$ patterns. Phase rotation estimator 74 estimates common phase terms, $\phi_1$, and phase rotation corrector 76 corrects the phase term for each $\{b_{k+i}\}_{i=0}^{7}$ pattern (120). Element 80 separates and doubles the real portion of each of the complex $\{b_{k+i}\}_{i=0}^{7}$ patterns (122). Subtraction unit 81 generates the negative error cost function by removing bias constant 82 from each of the real patterns (124), and then maximum picker 84 chooses the $\{b_{k+i}\}_{i=0}^{7}$ pattern that maximizes the negative error cost function (126). Symbol estimator 86 makes the final symbol decision in the demodulation technique by combining the best pattern match with its associated phase rotation (128) determined by phase rotation estimator 74.

Figure 8:
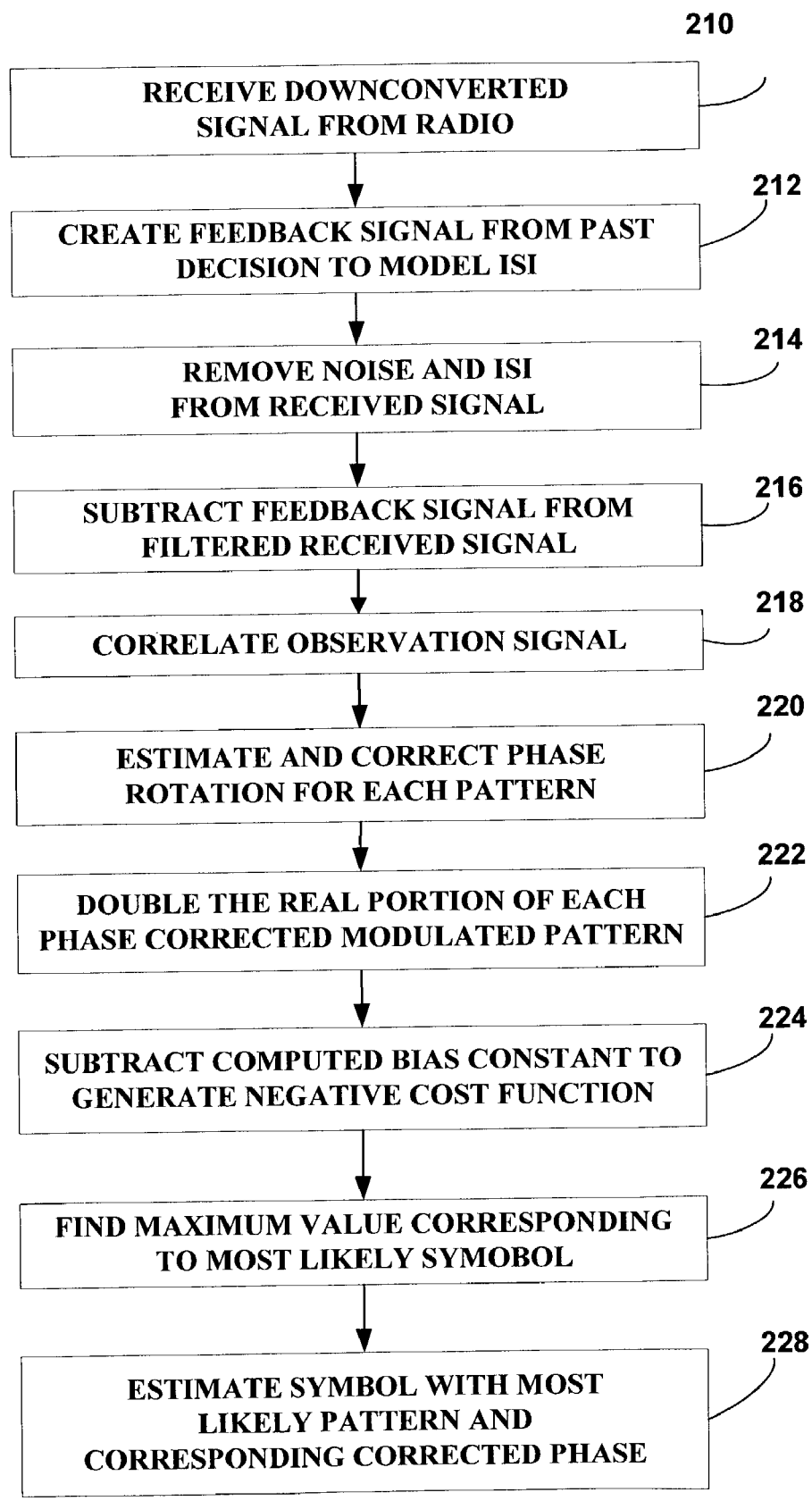
FIG. 8 is a flow diagram illustrating a process for choosing the most likely symbol pattern to correctly decode a received signal for the receiver configuration in FIG. 6.

FIG. 8 is a flow diagram illustrating a process for demodulating a received signal in a wireless communication system using a DFE technique. The modem processing the signal has the structure generally represented in FIG. 6 with a matched filter process occurring outside a feedback loop. As shown in FIG. 8, modem 22 receives a downconverted signal from radio 20 (210). Feedback filter 98 creates a feedback signal from past decisions to model ISI effects (212). Matched filter 90 removes noise and ISI from the received, downconverted signal (214). The matched filter operation may be a time variant or time invariant operation depending on the error cost function model used. The feedback signal is then subtracted from the filtered received signal to eliminate ISI (216). Notably, in contrast to the process of FIG. 7, the process of FIG. 8 applies the matched filter operation (214) prior to the subtraction of the feedback signal to eliminate ISI (216).

Transform operation 92 correlates the observation signal (218) generally using either a bank of correlators or, in the CCK case, a Fast Walsh Transform (FWT), to generate a complex value for each of the 64 $\{b_{k+i}\}_{i=0}^{7}$ patterns. Phase rotation estimator 94 estimates 64 common phase terms, $\phi_1$, and phase rotation corrector 96 corrects the phase term for each $\{b_{k+i}\}_{i=0}^{7}$ pattern (220). Element 100 separates and doubles the real portion of each of the complex $\{b_{k+i}\}_{i=0}^{7}$ patterns (222). Subtraction unit 101 generates the negative error cost function by removing bias constant 102 from each of the real patterns (224), and then maximum picker 104 chooses the $\{b_{k+i}\}_{i=0}^{7}$ pattern that maximizes the negative error cost function (226). Symbol estimator 106 makes the final symbol decision in the demodulation technique by combining the best pattern match with its associated phase rotation (228) determined by phase rotation estimator 94.

Various embodiments of the invention have been described. These and other embodiments are within the scope of the following claims.

The invention claimed is:

1. A method performed in a wireless communication device comprising: generating, in the wireless communication device, a feedback signal based on a first symbol decision for a first wireless signal observation; applying the feedback signal to a received wireless signal to produce a second wireless signal observation; correlating the second wireless signal observation with a plurality of candidate modulation patterns to produce a plurality of correlations, wherein each of the correlations represents a correlation of the second wireless signal observation with one of the candidate modulation patterns; estimating a plurality of phase rotations based on the correlations, wherein at most one of the phase rotations is estimated for each of the candidate modulation patterns; correcting the plurality of correlations based on the estimated a phase rotations to produce a plurality of corrected correlations; selecting one of the modulation patterns based on a maximum likelihood function and the plurality of corrected correlations; and generating a second symbol decision based on the selected modulation pattern and the estimated phase rotation corresponding to the selected modulation pattern.

2. The method of claim 1, wherein the first and second symbol decisions are CCK symbol decisions.

3. The method of claim 1, wherein the maximum likelihood function includes a negative cost function.

4. The method of claim 1, wherein generating the feedback signal includes applying a feedback filter to the first symbol decision to cancel intersymbol interference in the second wireless signal observation.

5. The method of claim 1, further comprising applying a matched filter to the received wireless signal.

6. The method of claim 1, further comprising applying a time-variant matched filter to the received wireless signal.

7. The method of claim 1, further comprising applying a matched filter to the received wireless signal prior to applying the feedback signal to the received wireless signal.

8. The method of claim 1, further comprising applying a matched filter to the received wireless signal after applying the feedback signal to the received wireless signal.

9. The method of claim 1, wherein correlating the second wireless signal observation includes correlating the second wireless signal observation in parallel with a bank of correlators.

10. The method of claim 1, wherein correlating the second wireless signal observation includes correlating the second wireless signal observation with a fast Walsh transformer.

11. The method of claim 1, further comprising applying a pattern-dependent bias cancellation to the candidate modulation patterns.

12. A wireless communication device comprising:
a feedback loop that generates a feedback signal based on a first symbol decision for a first wireless signal observation, and applies the feedback signal to a received wireless signal to produce a second wireless signal observation;
a correlator that correlates the second wireless signal observation with a plurality of candidate modulation patterns to produce a plurality of correlations, wherein each of the correlations represents a correlation of the second wireless signal observation with one of the candidate modulation patterns;
a phase estimator that estimates a plurality of phase rotations based on the correlations, wherein at most one of the phase rotations is estimated for each of the modulation patterns;
a phase corrector that corrects the plurality of correlations based on the estimated phase rotations to produce a plurality of corrected correlations;
a maximum picker that selects one of the modulation patterns based on a maximum likelihood function and the plurality of corrected correlations; and
a symbol estimator that generates a second symbol decision based on the selected modulation pattern and the estimated phase rotation corresponding to the selected modulation pattern.

13. The device of claim 12, wherein the first and second symbol decisions are CCK symbol decisions.

14. The device of claim 12, wherein the maximum likelihood function includes a negative cost function.

15. The device of claim 12, wherein the feedback loop includes a feedback filter that filters the first symbol decision to cancel intersymbol interference in the second wireless signal observation.

16. The device of claim 12, further comprising a matched filter to filter the received wireless signal.

17. The device of claim 12, further comprising a time-variant matched filter to filter the received wireless signal.

18. The device of claim 12, further comprising a matched filter to filter the received wireless signal prior to application of the feedback signal to the received wireless signal.

19. The device of claim 12, further comprising a matched filter to filter the received wireless signal after application of the feedback signal to the received wireless signal.

20. The device of claim 12, wherein the correlator includes a bank of correlators that correlate the second wireless signal observation with the candidate modulation patterns in parallel.

21. The device of claim 12, wherein the correlator includes a fast Walsh transformer.

22. The device of claim 12, further comprising a pattern-dependent bias cancellation circuit to cancel pattern-dependent bias in the candidate modulation patterns.

23. A wireless communication device comprising:
means for generating a feedback signal based on a first symbol decision for a first wireless signal observation;
means for applying the feedback signal to a received wireless signal to produce a second wireless signal observation;
means for correlating the second wireless signal observation with a plurality of candidate modulation patterns to produce a plurality of correlations, wherein each of the correlations represents a correlation of the second wireless signal observation with one of the candidate modulation patterns;
means for estimating a plurality of phase rotations based on the correlations, wherein at most one of the phase rotations is estimated for each candidate modulation pattern;

means for correcting the plurality of correlations based on the estimated a phase rotations to produce a plurality of corrected correlations;

means for selecting one of the modulation patterns based on a maximum likelihood function and the plurality of corrected correlations; and means for generating a second symbol decision based on the selected modulation pattern and the estimated phase rotation corresponding to the selected modulation pattern.

24. A wireless communication device comprising: a receiver to receive a wireless signal; a symbol estimator to generate a symbol decision for the received wireless signal based on a set of possible symbols; and a symbol decision feedback equalization system to reduce multipath channel effects on the symbol decision based on past symbol decisions, wherein the symbol decision feedback equalization system evaluates a maximum likelihood function for at most a subset of the set of possible symbols, wherein the symbol decision feedback equalization system includes: a feedback loop that generates a feedback signal based on a first symbol decision tbr a first wireless signal observation, and applies the feedback signal to the received wireless signal to produce a second wireless signal observation; a correlator that correlates the second wireless signal observation with a plurality of candidate modulation patterns to produce a plurality of correlations, wherein each of the correlations represents a correlation of the second wireless signal observation with one of the candidate modulation patterns; a phase estimator that estimates a plurality of phase rotations based on the correlations, wherein at most one of the phase rotations is estimated for each of the modulation patterns; a phase collector that corrects the plurality of correlations based on the estimated phased rotations to produce a plurality of corrected correlations; and a maximum picker that selects one of the modulation patterns based on a maximum likelihood function and the plurality of corrected correlations, wherein the symbol estimator generates the second symbol decision based on the selected modulation pattern and the estimated phase rotation corresponding to the selected modulation pattern.

25. The device of claim 24, wherein the received signal conforms to one of the IEEE 802.11 wireless communication standards.

26. The method of 1, wherein generating a feedback signal further comprises applying a time-variant feedback filter in a feedback loop.

27. The method of claim 26, wherein filter taps in the time-variant feedback filter are replaced by zeros increasingly as a function of time from one end to another end during a symbol period.

28. The method of claim 1,
wherein estimating the plurality of phase rotations further comprises determining a common phase for a modulation pattern by estimating a phase from each of the correlations, and
wherein correcting the correlations further comprises compensating the phase in the correlations before selecting one of the modulation patterns based on the maximum likelihood function.

29. The method of claim 1, further comprising applying a time-varying matched filter to the received wireless signal and a time-invariant feedback filter in a feedback loop.

30. The method of claim 26, wherein filter taps in the time-variant matched filter are replaced by zeros increasingly as a function of time from one end to another end during a symbol period.

31. The method of claim 11, further comprising obtaining the pattern-dependent bias by correlating a channel response with a corresponding pattern, squaring the magnitude of the correlation, and accumulating the squared magnitude.

* * * * *

UNITED STATES PATENT AND TRADEMARK OFFICE
CERTIFICATE OF CORRECTION

PATENT NO. : 7,526,050 B2
APPLICATION NO. : 10/460766
DATED : April 28, 2009
INVENTOR(S) : Kim et al.

It is certified that error appears in the above-identified patent and that said Letters Patent is hereby corrected as shown below:

Column 2, line 38, "to produced a second" should be -- to produce a second --

Column 13, line 2, "estimated a phase" should be -- estimated phase --

Column 13, line 22, "decision tbr a" should be -- decision for a --

Signed and Sealed this
Twenty-seventh Day of March, 2012

David J. Kappos
*Director of the United States Patent and Trademark Office*